(12) United States Patent
Berkcan et al.

(10) Patent No.: US 9,086,266 B2
(45) Date of Patent: Jul. 21, 2015

(54) WIRELESS SENSORS, DETECTION METHODS, AND SYSTEMS

(71) Applicant: General Electric Company, Schenectady, NY (US)

(72) Inventors: Ertugrul Berkcan, Clifton Park, NY (US); Emad Andarawis Andarawis, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 3 days.

(21) Appl. No.: 13/953,830

(22) Filed: Jul. 30, 2013

(65) Prior Publication Data

US 2013/0312533 A1    Nov. 28, 2013

Related U.S. Application Data

(63) Continuation-in-part of application No. 13/101,834, filed on May 5, 2011, now Pat. No. 8,601,880, and a continuation-in-part of application No. 12/255,355, filed on Oct. 21, 2008, now Pat. No. 7,975,554.

(51) Int. Cl.
*G01B 7/16* (2006.01)

(52) U.S. Cl.
CPC .. *G01B 7/18* (2013.01); *G01B 7/16* (2013.01); *G01B 2210/58* (2013.01)

(58) Field of Classification Search
CPC .......................................... G01B 7/16
USPC .......................................... 73/773
See application file for complete search history.

(56) References Cited

U.S. PATENT DOCUMENTS

| | | | |
|---|---|---|---|
| 3,757,580 A * | 9/1973 | Crocker et al. | 73/862.339 |
| 4,225,851 A | 9/1980 | Reschovsky et al. | |
| 4,354,190 A * | 10/1982 | Reschovsky | 340/870.18 |
| 4,651,571 A | 3/1987 | McGlade | |
| 5,515,041 A * | 5/1996 | Spillman, Jr. | 340/870.31 |
| 6,543,296 B1 | 4/2003 | Bermudez | |
| 6,656,135 B2 | 12/2003 | Zogbi et al. | |
| 7,245,117 B1 | 7/2007 | Joy et al. | |
| 7,347,101 B2 | 3/2008 | Thomson et al. | |
| 7,389,682 B2 | 6/2008 | Ja Vaherian | |
| 7,439,723 B2 | 10/2008 | Allen et al. | |
| 7,466,120 B2 | 12/2008 | Miller et al. | |

(Continued)

FOREIGN PATENT DOCUMENTS

JP         11236801        8/1999

*Primary Examiner* — Lisa Caputo
*Assistant Examiner* — Octavia Hollington
(74) *Attorney, Agent, or Firm* — John P. Darling

(57) ABSTRACT

A wireless sensor including a resistive element, a modulating element located on a rotating component and at least one of a transmitting element and a receiving element, wirelessly coupled to the modulating element. The modulating element is configured to modulate the wireless coupling, between the at least one of a transmitting element and a receiving element, in response to a change in resistance in the resistive element. The modulation of the wireless coupling is indicative of a measurand on the rotating component. A method of detecting a measurand in a rotating component of a rotary machine includes wirelessly coupling at least one of a transmitting element and a receiving element to a modulating element; modulating the wireless coupling with the modulating element located on the rotating component; and calculating the measurand in the rotating component based on the modulation of the wireless coupling.

19 Claims, 8 Drawing Sheets

(56) References Cited

U.S. PATENT DOCUMENTS

| | | |
|---|---|---|
| 7,764,958 B2 | 7/2010 | Townsend et al. |
| 7,975,554 B2 | 7/2011 | Berkcan et al. |
| 8,223,036 B2 * | 7/2012 | Mitchell et al. .......... 340/870.07 |
| 8,307,715 B2 | 11/2012 | Ranson |
| 8,310,120 B2 | 11/2012 | Andarawis et al. |
| 8,519,866 B2 * | 8/2013 | Mitchell et al. .......... 340/870.01 |
| 2008/0077016 A1 | 3/2008 | Sparks et al. |
| 2011/0040498 A1 | 2/2011 | Huang et al. |
| 2011/0158331 A1 | 6/2011 | Kavaler et al. |
| 2012/0286935 A1 | 11/2012 | Huang |

* cited by examiner

WIRELESS SENSORS, DETECTION METHODS, AND SYSTEMS

BACKGROUND

The present disclosure generally relates to measurement of strain and/or temperature in rotating machinery.

Rotary machinery, for example, blades in an aircraft engine, may experience conditions during operation, which may damage the machinery. Accurate measurements of these conditions, including strain and temperatures, are necessary to take appropriate measures to correct or prevent any damage that may occur in the rotary machinery. One approach to measurement of strain and/temperature in rotary machinery may use wired sensors, which require wiring between a rotating component and a stationary part of the rotary machinery. However, a wired approach may be complex, expensive, and unreliable, due in part to the high temperature of the machinery in operation, as the electronic characteristics of the wiring may limit the range of temperatures over which a wired sensor may operate accurately.

Due to the limitations of wired sensors, wired measurements of a rotary machine may only be taken during testing of the rotary machinery; during operation in the field, wires sensors may be impractical. However, monitoring these conditions over the entire lifespan of the rotary machinery is desirable to ensure reliable operation of the rotary machinery. Strain and/or temperature measurements taken in the field may be correlated with control parameters to optimize field operation of the rotary machinery. Change observed in these measurements over time may be also used to assess the health of the blades of the rotary machinery, allowing for appropriate maintenance scheduling.

Accordingly, there remains a need in the art for a sensor, and more particularly a strain sensor or a temperature sensor, that is accurate over a wide range of temperatures and conditions, and that may be used over the lifespan of rotary machinery.

BRIEF DESCRIPTION

Disclosed herein are systems and methods for a wireless sensor. In one embodiment, a sensor is disclosed comprising a resistive element; a modulating element located on a rotating component; and at least one of a transmitting element and a receiving element, wirelessly coupled to the modulating element. The modulating element modulates the wireless coupling, between the at least one of a transmitting element and a receiving element, in response to a change in resistance of the resistive element. The modulation of the wireless coupling is indicative of a measurand on the rotating component.

In another embodiment, a method of detecting a measurand in a rotating component of a rotary machine is disclosed. The method comprising wirelessly coupling at least one of a transmitting element and a receiving element to a modulating element, wherein the modulating element is located on the rotating component and selected to modulate a resistive element; modulating the wireless coupling with the modulating element; and calculating the measurand in the rotating component based on the modulation of the wireless coupling.

In yet another embodiment, disclosed is a wireless sensing system, comprising: at least one of a transmitting element and a receiving element; a modulating element located on a rotating component of a rotary machine and wirelessly coupled to the at least one of a transmitting element and a receiving element. The modulating element is selected to modulate the wireless coupling between the at least one of a transmitting element and a receiving element. The modulation of the wireless coupling is indicative of a measurand on the rotating component. The system further comprising a processor configured to calculate at least one of a strain in the rotating component, temperature in the rotating component, and temperature about the rotating component based on the modulation of the wireless coupling.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

Figure 1:
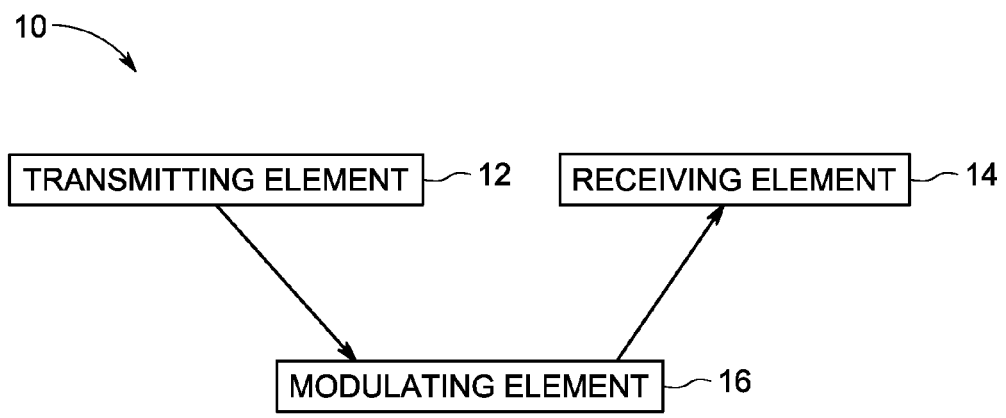
FIG. 1 illustrates an example arrangement of a wireless sensing system in accordance with one or more embodiments shown or described herein.

FIG. 1 illustrates an example arrangement of a wireless sensing system 10. In an embodiment, the wireless sensing system 10 is a wireless strain sensing system configured to measure strain on a rotating component. In an alternate embodiment, the wireless sensing system 10 is a wireless temperature sensing system configured to measure the temperature of a rotating component thus enabling accurate assessment of the health of the component, a component cooling system, or the like. Alternatively, the wireless temperature sensing system may be configured to measure a temperature in an environment about a component, such as a flow path temperature, to aid in controlling combustion, fuel/air mixture, or the like.

Illustrated in FIG. 1, is a transmitting element 12 in wireless communication with a receiving element 14. The connection between the transmitting element 12 and the receiving element 14 is modulated by a modulating element 16. The modulating element 16 may move with respect to the transmitting element 12 and the receiving element 14 due to strain and/or temperature in the system. This movement of the modulating element 16 modulates the wireless coupling between the transmitting element 12 and the receiving element 14, allowing the strain and/or temperature in the system to be determined at the receiving element 14.

Figure 2:
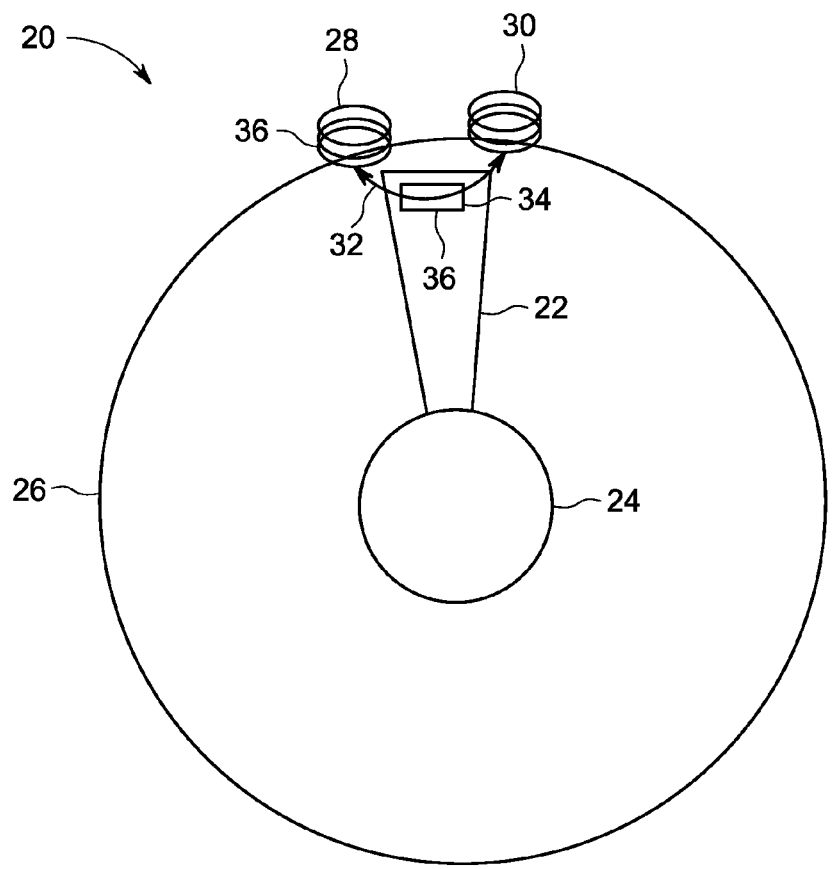
FIG. 2 illustrates an example arrangement of a wireless sensor in accordance with one or more embodiments shown or described herein.
Figure 3:
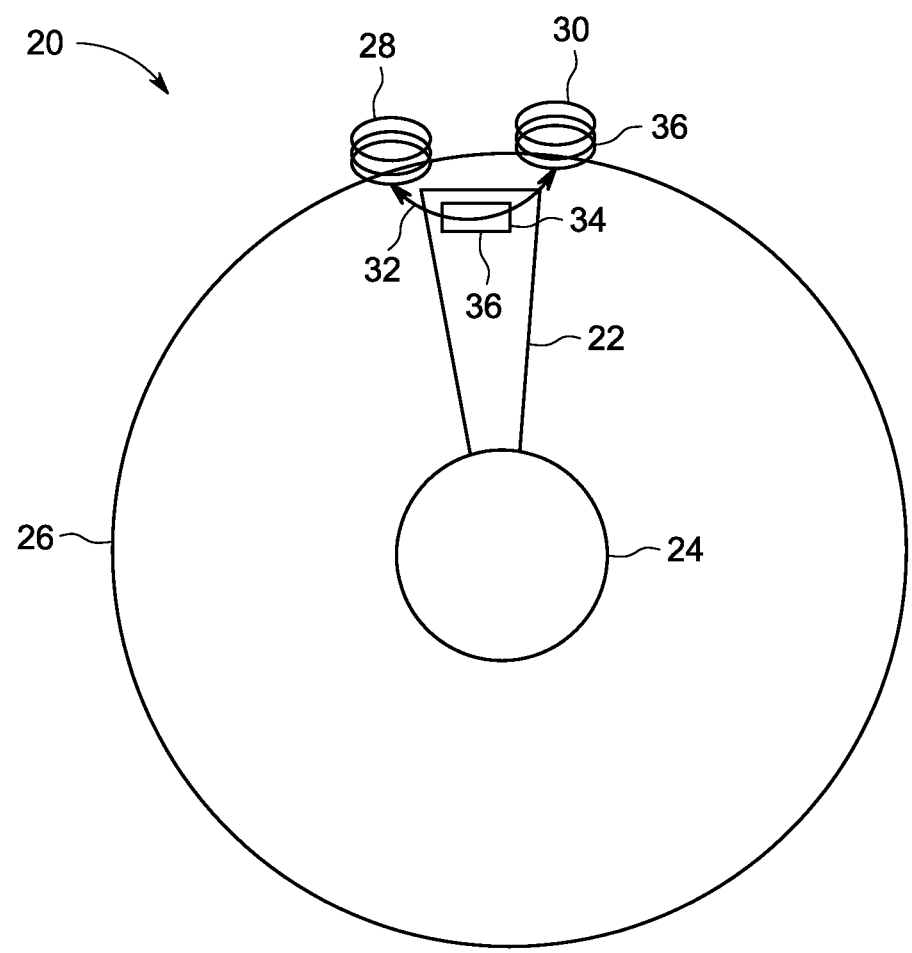
FIG. 3 illustrates an example arrangement of a wireless sensor in accordance with one or more embodiment shown or described herein.

FIGS. 2 and 3 illustrate in cross-section, an engine 20 and illustrate embodiments of a wireless sensor, as disclosed herein. It should be noted that although the illustrated examples are directed to a turbine engine application, the disclosure is more broadly applicable to measuring strain and/or temperature in rotating components and/or temperature proximate the rotating components of any rotary machine, non-limiting examples of which include wind turbines, and electric motors. A blade 22 rotates about axle 24 within stationary component, or shroud, 26. Although only one blade 22 is shown in FIGS. 2 and 3, engine 20 may comprise a plurality of rotating blades. In the illustrated examples, a transmitting element 28 and receiving element 30 are mounted on the stationary component 26. In an alternate embodiment, only one of the transmitting element 28 or the receiving element 30 is required for operation. Non-limiting examples of the transmitting element 28 may comprise a coil, such as an inductive coil, an antenna structure, metal on an insulator, or a drawn conductor on a ceramic substrate. Non-limiting examples of the receiving element 30 may comprise a coil, such as an inductive coil, an antenna structure, metal on an insulator, or a drawn conductor on a ceramic substrate. The transmitting element 28 and the receiving element 30 are connected by a wireless coupling 32. In some embodiments, the wireless coupling 32 may be a magnetic coupling such as a near field, a mutually inductive coupling, or a far field electric field coupling. For embodiments in which the wireless coupling 32 comprises a magnetic coupling, the effective coupling constant (k) of the coupling 32 between the transmitting element 28 and the receiving element 30 is related to the rate of change of the magnetic field (B) of the wireless coupling 32, i.e., k~d/dt(B). As the blade 22 rotates, the wireless coupling 32 is modulated by a modulating element 34, which is disposed on the surface of the blade 22. The modulation of the wireless coupling 32 is indicative of a measurand on the rotating component, wherein the measurand is the strain on the component, a temperature of the component, or a temperature in an environment about the component.

As best illustrated in FIG. 2, in an embodiment, a resistive element 36 is disposed in the transmitting element 28 and configured to modify the electrical characteristics of the transmitting element 28 that are subsequently detected by the receiving element 30. In an alternate embodiment, as best illustrated in FIG. 3, the resistive element 36 is disposed in the receiving element 30, configured to serve as both a transmitter and receiver. In an embodiment, the resistive element 36 and the modulating element 34 may be configured as a single element. In an alternate embodiment, the resistive element 36 and the modulating element 34 may be configured as separate elements. The resistive element 36 is configured to modify the electrical characteristics of the receiving element 30. The receiving element 30 detects a change in electrical characteristics when the value of that resistance is modulated by the modulating element 34. In yet another embodiment, the transmitting element 28 can serve as both transmitter and receiver.

In an embodiment where the sensor is configured as a wireless strain sensor, strain from the rotation may cause deformation in the blade 22 (for example, blade 22 may stretch), moving modulating element 34 relative to the wireless coupling 32, and causing further modulation of the wireless coupling 32. Therefore, the modulation of the wireless coupling 32 (d(B)/dt) is a function of the displacement of the modulating element 34. Because the strain experienced by the blade 22 is a function of the displacement of the modulating element 34, the strain may be determined as a function of the coupling constant (k) between the transmitting element 28 and the receiving element 30.

In an embodiment, where the wireless sensor is configured as wireless temperature sensor, a change in temperature may cause the modulating element 34 to undergo a change further affecting the wireless coupling 32, causing further modulation of the wireless coupling 32. More particularly, in an embodiment of a wireless temperature sensor, the modulating element 34 may be a magnetic field generator, located on the rotating component, or blade 22, where the field strength changes as a function of temperature. The resistive element 36 may be a magnetoresistive element located on the stationary component, or shroud 26. The resistance of the resistive element 36 is modulated by the magnetic field strength generated by the magnetic field generator.

The strain on the blade 22 and/or temperature is thereby wirelessly determined using a passive approach with no active electronics or p/n junctions, which may only operate accurately over a limited range of temperatures. At higher temperatures, leakage through p/n junctions may increase to a point where accuracy and life of the electronics are adversely affected. As previously indicated, embodiments of the modulating element 34 may comprise an optical generator, electric field generator and/or magnetic field generator selected to modulate the resistance of a resistive element 36 in a circuit. During operation, the modulating element 34 modulates the resistance of a circuit on the shroud 26. The modulating element 34 may be selected to have a high temperature Curie point. Embodiments of a wireless sensor may produce accurate results at temperatures up to 1200° F. In an embodiment, the resistive element 36 is an active resistive element. In an alternate embodiment, the resistive element 36 is a passive resistive element. In an embodiment, the resistive element 36 may comprise a magnetostrictive material, a piezoelectric material, a photo transistor, a photoresistor, a pyroelectric material, a Hall effect device, or the like.

Figure 4:
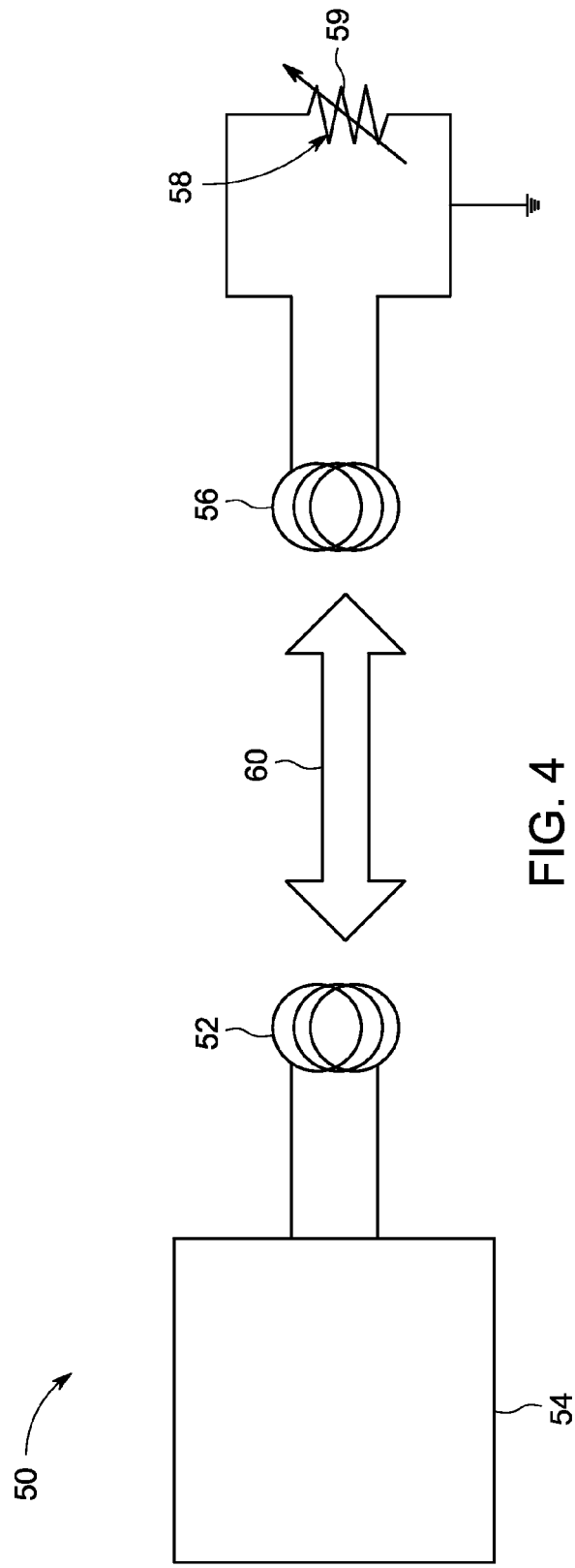
FIG. 4 illustrates an example arrangement of a wireless sensor pattern in accordance with one or more embodiments shown or described herein.

FIG. 4 illustrates an example arrangement of a wireless sensor 50. As previously indicated, the wireless sensor 50 may be configured as a wireless strain sensor or a temperature sensor. A receiving element 52 and reader electronics 54 are disposed around the shroud or approximately at the perimeter area of the blades (not shown). Although the illustrated example is directed to an engine, the sensor 50 is applicable to any type of rotary machine, including turbines, motors, or any other non-contact sensing application. In this particular, non-limiting example, as is discussed in further detail below regarding FIGS. 5, 6, and 7, a transmitting element 56 and sensor components 58 are disposed on one of the rotating blades (not shown). The impedance, in particular the resistance, of the passive circuit formed by the transmitting element 56 and the sensor components 58 is modulated by the measurand on the blade. It is well known that a change in the resistance of an element will also cause a change in the impedance of the circuit that includes said element. The modulation of a resistive element 59 in the transmitting element 56 (or equivalently the impedance of the transmitting element) in turn modulates a wireless coupling 60 between the receiving element 52 and the transmitting element 56, resulting in a change in impedance at the receiving element 52. The change in impedance at the receiving element 52 may be used to calculate the strain on the blade by the reader electronics 54. The strain on the blade may therefore be calculated wirelessly using a passive approach with no active electronics or p/n junctions, which may only operate accurately over a limited range of temperatures. The sensor components 58 may be selected to have a high temperature Curie point, and hence embodiments of a wireless strain sensor may produce accurate results at temperatures up to 1200° F.

In an alternate embodiment, wherein the sensor 50 is configured as a temperature sensor, the resistance of the resistive element 59 changes in response to temperature. The resistive element 59 may be a thermistor, a resistance temperature detector (RTD), or the like. In this embodiment, the resistive element 59 may be configured as a part of the modulating element 34 and located on the rotating component, and more particularly the blade, and electrically coupled to the transmitting element 56, also located on the rotating component.

Figure 5:
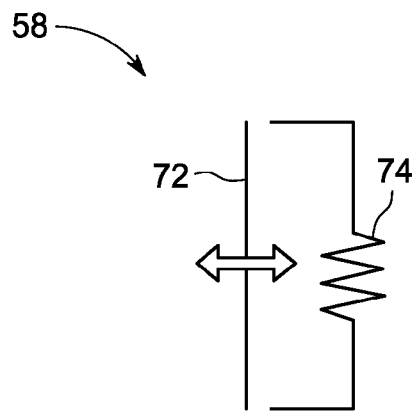
FIG. 5 illustrates an example arrangement of a modulating element pattern in accordance with one or more embodiments shown or described herein.
Figure 6:
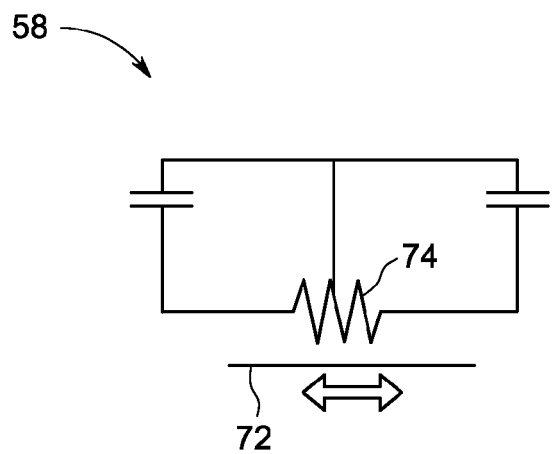
FIG. 6 illustrates an example arrangement of a modulating element pattern in accordance with one or more embodiments shown or described herein.
Figure 7:
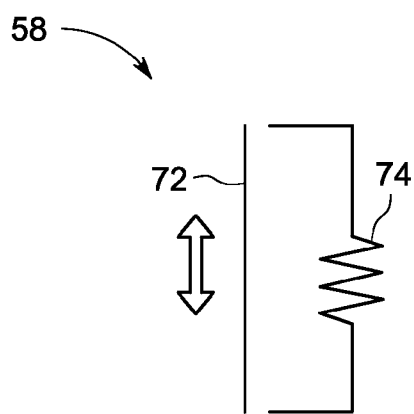
FIG. 7 illustrates an example arrangement of a modulating element pattern in accordance with one or more embodiments shown or described herein.

FIGS. 5, 6, and 7 show illustrative embodiments of a portion of a sensor circuit, and more particularly a sensor component 58. Referring to FIG. 5, the sensor component 58 may comprise a modulating element 72 and a resistive element 74. Strain and/or temperature on a blade, or about the blade, moves the relative position of the modulating element 72 with regards to the resistive element 74, as shown by the arrows. Even a small movement of the modulating element 72 in relation to the resistive element 74 may induce a relatively large change in the resistance/impedance of the circuit formed by the sensor component 58 and the transmitting element 56, which in turn modulates the resonance frequency and impedance of wireless coupling 60 between the receiving element 52 and the transmitting element 56, allowing the measurand to be wirelessly read out as discussed above with regards to FIG. 4. FIGS. 6 and 7 operate in a manner similar to FIG. 5, with the modulating element 72 moving relative to the resistive element 74, as shown by the arrows. The modulating elements 72 may comprise an optical generator, electric field generator and/or magnetic field generator selected to modulate the resistance of the resistive element 74. The resistive element may comprise a magnetostrictive material, a piezoelectric material, a photo transistor, a photoresistor, a pyroelectric material, a Hall effect device, or the like. In each embodiment, an effective resistance between the modulating element 72 and the resistive element 74 varies with the strain and/or temperature on the rotating component or temperature about the rotating component.

Figure 8:
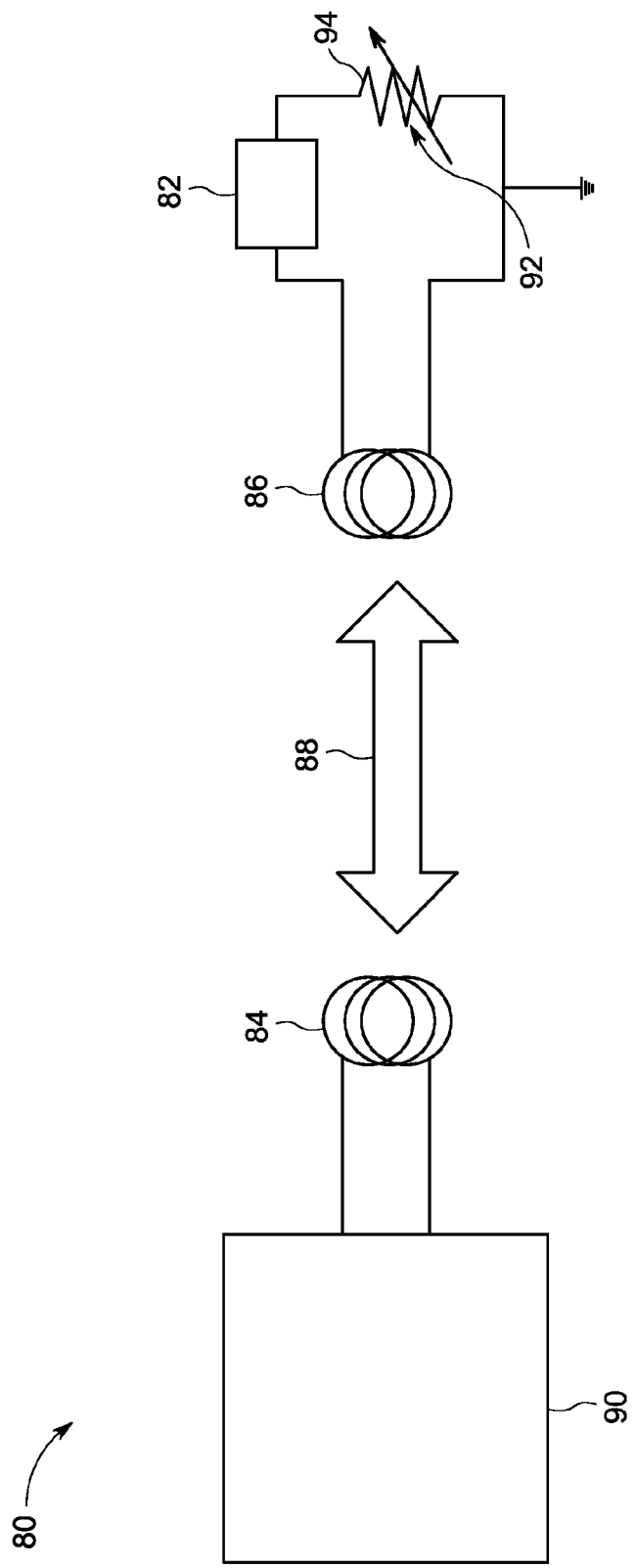
FIG. 8 illustrates an example arrangement of a wireless sensor comprising a resistive sensor circuit in accordance with one or more embodiments shown or described herein.

FIG. 8 illustrates an alternate embodiment of a wireless sensor 80 including an impedance transformer 82. As previously indicated, the wireless sensor 80 may be configured as a wireless strain sensor or a temperature sensor. The wireless sensor 80 comprises a receiving element 84, a transmitting element 86, a wireless coupling 88, reader electronics 90 and sensor components 92. The impedance transformer 82 shifts an operative characteristic of the circuit comprised of the transmitting element 86 and the sensor components 92 to a more suitable range, and amplifies the resulting shift detected at the receiving element 84. Said operative characteristic may include a frequency of operation, impedance, quality factor, dissipation factor. In an embodiment, the sensor components 92 comprise a resistive element 94. In an embodiment the resistive element 94 may comprise passive resistive elements, such as thermistor, a strain gage, a piezo-resistor and/or active resistive elements, such as a transistor or a photo-transistor having an ON-resistance, a diode having an AC resistance or a photoresistor. The resistive element 94 is configured to obtain a change in resistance as a result of a measured change in strain of the component, temperature of the component, and/or temperature about the rotating component of a rotary machine. More specifically, the resistive element 94 provides for a means to measure a changing loss (resistance) that results in quantifying quality factor changes.

Figure 9:
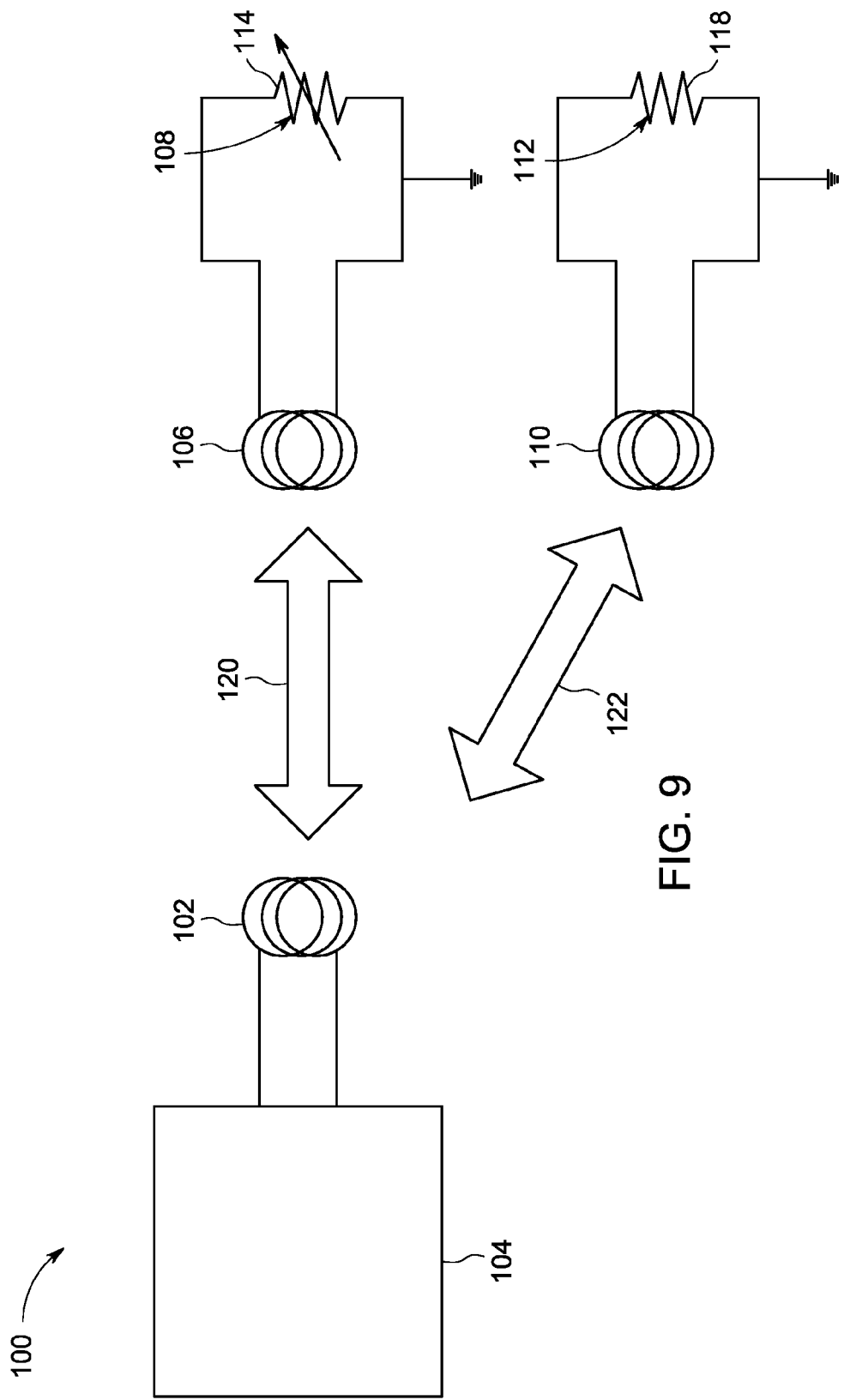
FIG. 9 illustrates an example arrangement of a wireless sensor with auto-referencing in accordance with one or more embodiments shown or described herein.

FIG. 9 illustrates an embodiment of a wireless sensor 100 including auto-referencing. As previously indicated, the wireless sensor 100 may be configured as a wireless strain sensor or a temperature sensor. A receiving element 102 and reader electronics 104 are disposed around the stationary component or approximately at the perimeter area of the rotating components, or, for the example of an engine, the blades (not shown). In the illustrated arrangement, a transmitting element 106 and sensor components 108 are mounted on one of the blades, as are a transmitting element 110 and reference components 112. The sensor components 108 comprise a resistive element 114 and a modulating element, whereas the reference components 112 comprise a resistive element 118 only. In an embodiment the resistive elements 114 and 118 may comprise passive resistive elements, such as thermistor, a strain gage, a piezo-resistor and/or active resistive elements, such as a transistor or a photo-transistor having an ON-resistance, a diode having an AC resistance or a photoresistor. The resistive element 114 is configured to obtain a change in resistance as a result of a measured change in strain of the component, temperature of the component, and/or temperature about the component of a rotary machine. More specifically, the resistive element 114 provides for a means to measure a changing loss (resistance) that results in quantifying quality factor changes.

In an embodiment where the wireless sensor 100 is configured as a strain sensor, during operation, the strain on the blade moves the modulating element in relation to the resistive element 114 in sensor components 108 (as discussed above in relation to FIGS. 5, 6, and 7) modulating a wireless coupling 120. A wireless coupling 122 is not modulated by the strain on the blade, and may be used as a reference to determine any effects on the wireless coupling 120 due to noise, temperature variation, or transmit power variations. The strain on the blade is then calculated based on the wireless couplings 120 and 122 at the reader electronics 104. As the wireless coupling 122 is not affected by strain, but may be modulated by variations in temperature or coupling strength, confounding effects of temperature and coupling strength may be removed from the strain data, and a corrected strain measurement is obtained, giving increased accuracy, sensitivity and specificity. Additionally, information about other variables in the rotary machinery, such as the operating temperature, may be assessed independently of strain; this knowledge may be used to determine the overall health of the rotary machinery.

Figure 10:
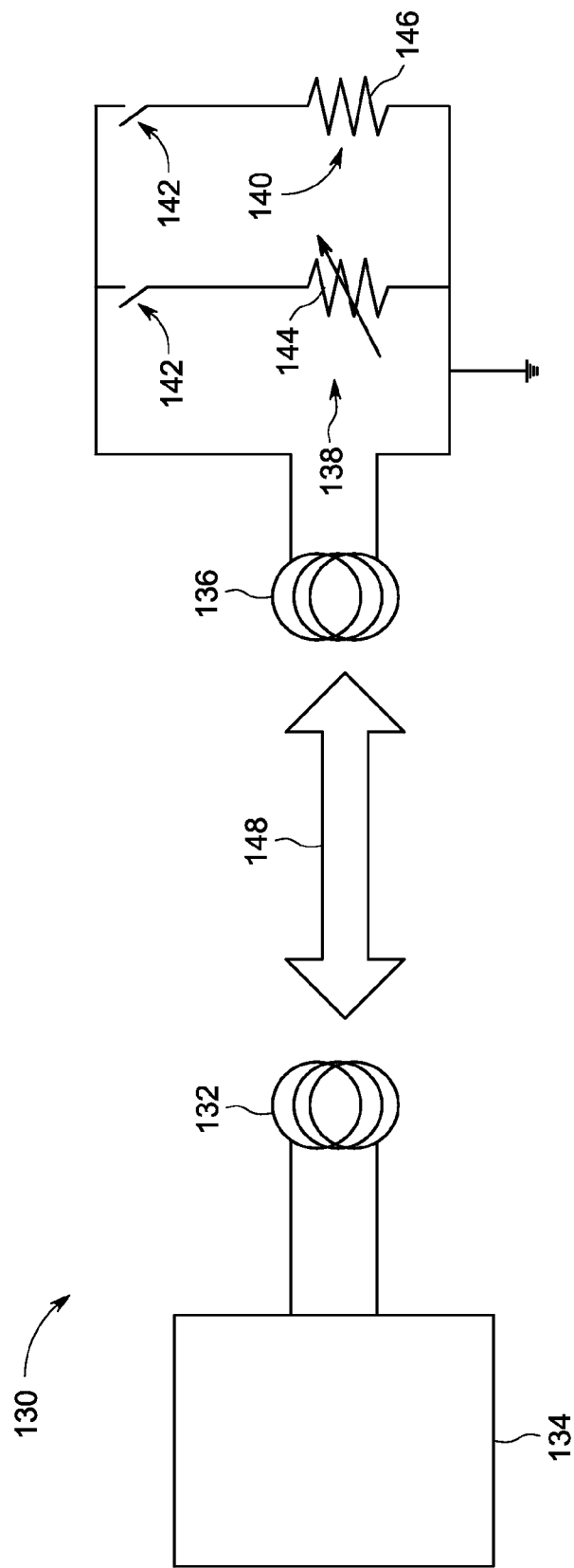
FIG. 10 illustrates an example arrangement of a wireless sensor with auto-referencing in accordance with one or more embodiments shown or described herein.

FIG. 10 illustrates a further embodiment of a wireless sensor 130 comprising auto-referencing. As previously indicated, the wireless sensor 130 may be configured as a wireless strain sensor or a temperature sensor. A receiving element 132 and reader electronics 134 are disposed around the stationary component or approximately at the perimeter area of the rotating components, or, for the example of an engine, the blades (not shown). A transmitting element 136, sensor components 138, reference components 140, and a plurality of switches 142 are disposed on the rotating blade. The sensor components 138 comprise a resistive element 144 and a modulating element and the reference components 140 comprise a resistive element 146. In an embodiment the resistive elements 114 and 118 may comprise passive resistive elements, such as thermistor, a strain gage, a piezo-resistor and/or active resistive elements, such as a transistor or a phototransistor having an ON-resistance, a diode having an AC resistance, or a photoresistor. The resistive element 144 is configured to obtain a change in resistance as a result of a measured change in strain and/or temperature of the component, and/or temperature about the component of a rotary machine. More specifically, the resistive element 144 provides for a means to measure a changing loss (resistance) that results in quantifying quality factor changes.

Switches 142 may be used to complete the circuit with transmitting component 186 using either sensor components 138 or reference components 140, allowing reader electronics 134 to obtain readings of a wireless coupling 148 either with or without the presence of a modulating element. The reader electronics 134 may therefore cancel out any effects on the wireless coupling 148 due to noise.

Figure 11:
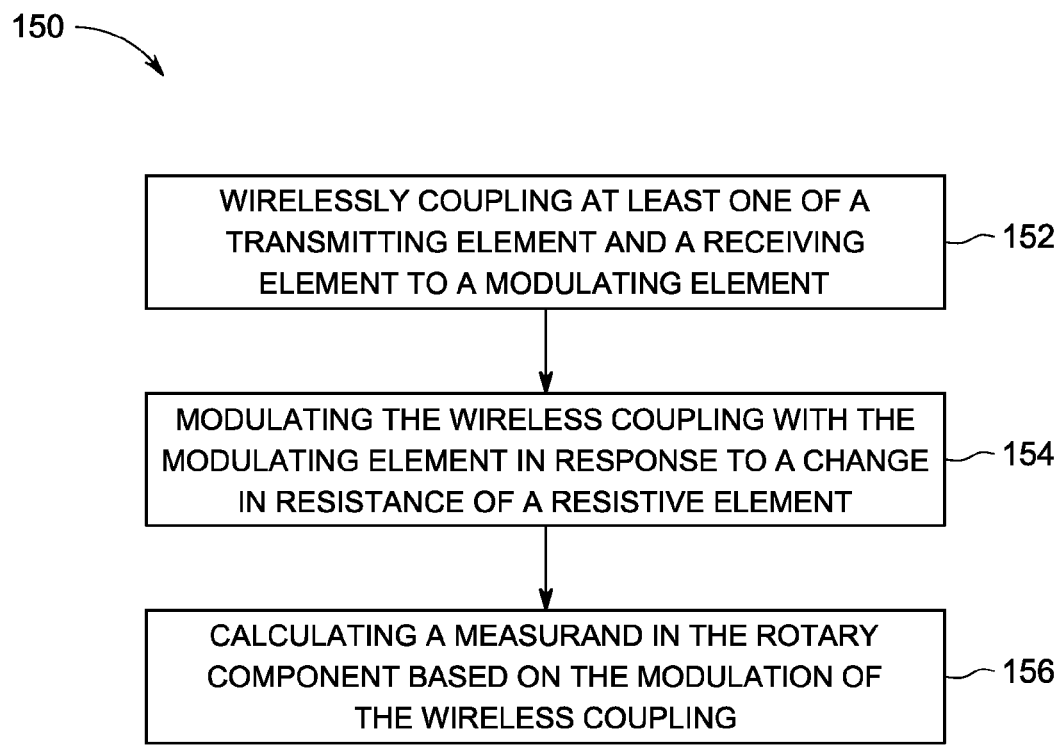
FIG. 11 illustrates an example of a method of detecting a measurand in a rotating component of a rotary machine in accordance with one or more embodiments shown or described herein.

FIG. 11 illustrates an embodiment of a method 150 of detecting a measurand, such as strain and/or temperature, in a component, and/or temperature about a component of a rotary machine. In a first step 152, a first coil and a second coil are wirelessly coupled. The wireless coupling is modulated, in response to a change in resistance of a resistive element, in a step 154, by a modulating element located on the rotating component. In some embodiments, the resistive element may comprise a passive resistive element. In some embodiments, the resistive element may comprise an active resistive element. As previously indicated, in an embodiment, the modulating element and the resistive element may be configured as a single element. In an alternate embodiment, the modulating element and the resistive element may be configured as separate elements. In a step 156, at least one of a strain in the rotating component, a temperature of the rotating component, or a temperature about the rotating component is calculated based on the modulation of the wireless coupling.

In an embodiment of a wireless sensor, the modulating element may comprise a high permeability material or a high permittivity material. Some examples of high permeability materials that may be used in embodiments of a wireless sensor include, but are not limited to, iron alloys, nickel alloys, an iron-nickel alloy, chrome, or other ferromagnetic alloys. Examples of high permittivity materials may include, but are not limited to, oxides, ceramics, alumina, barium silicate, as well as conventional capacitor ceramic material such as NPO and X7R, or $LiNbO_3$. An appropriate material may be selected based on the operating temperature of the rotary machine that is being measured, as different materials may have different magnetic responses as different temperatures. Embodiments of a strain sensor and/or temperature sensor may be used to detect strain and/or temperature in any machine that comprises rotating components, including but not limited to a compressor or a turbine in an aircraft engine, power generation turbines such as gas or steam turbines, or a generator.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

Also, the terms "first", "second", and the like do not denote any order, quantity, or importance, but rather are used to distinguish one element from another; and the terms "the", "a", and "an" do not denote a limitation of quantity, but rather denote the presence of at least one of the referenced items. The modifier "about" used in connection with a quantity is inclusive of the stated value and has the meaning dictated by the context or includes at least the degree of error associated with measurement of the particular quantity. Furthermore, all ranges reciting the same quantity or physical property are inclusive of the recited endpoints and independently combinable.

Although only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A wireless sensor comprising:
    a passive resistive element;
    a modulating element located on a rotating component; and
    at least one of a transmitting element and a receiving element, wirelessly coupled to the modulating element;
    wherein the modulating element modulates the wireless coupling, between the at least one of a transmitting element and a receiving element, in response to a change in resistance of the passive resistive element, and
    wherein the modulation of the wireless coupling is indicative of a measurand on the rotating component.

2. The sensor of claim 1, wherein the passive resistive element is one of a thermistor, a strain gage, a piezoresistor, a magnetostrictive material, a piezoelectric material, a photo transistor, a photoresistor, a pyroelectric material, and a Hall effect device.

3. The sensor of claim 1, wherein the modulating element and the passive resistive element are configured as a single element.

4. The sensor of claim 1, wherein the modulating element and the passive resistive element are configured as separate elements.

5. The sensor of claim 1, wherein a transmitting element and a receiving element are located on a stationary component at a perimeter of the rotating component.

6. The sensor of claim 1, wherein a receiving element is located on a stationary component at a perimeter of the rotating component, and a transmitting element is located on the rotating component.

7. The sensor of claim 1, wherein the sensor is configured as one of a strain sensor or a temperature sensor.

8. The sensor of claim 7, comprising a strain sensor circuit located on the rotating component, the strain sensor circuit comprised of the transmitting element, the modulating element and the passive resistive element, wherein an effective resistance of the passive resistive element varies with the strain on the rotating component.

9. The sensor of claim 7, comprising a temperature sensor circuit located on the rotating component, the temperature sensor circuit comprised of the transmitting element, the modulating element, and the passive resistive element, wherein an effective resistance of the passive resistive element varies with the temperature on the rotating component or about the rotating component.

10. The sensor of claim 1, further comprising a reference circuit located on the rotating component, the reference circuit comprising a second resistive element, wherein an output of the reference circuit is compared to an output of the sensor circuit to determine an effect of noise on the wireless coupling.

11. The sensor of claim 1, wherein the wireless coupling is one of a magnetic coupling, an electromagnetic coupling, and an electric coupling.

12. A method of detecting a measurand in a rotating component of a rotary machine, comprising:
   wirelessly coupling at least one of a transmitting element and a receiving element to a modulating element, wherein the modulating element is located on the rotating component and selected to modulate a passive resistive element;
   modulating the wireless coupling with the modulating element; and
   calculating the measurand in the rotating component based on the modulation of the wireless coupling.

13. The method of claim 12, further comprising disposing the transmitting element and the receiving element on a stationary component at a perimeter of the rotating component.

14. The method of claim 12, further comprising disposing the receiving element on a stationary component at a perimeter of the rotating component, and disposing the transmitting element on the rotating component.

15. The method of claim 12, further comprising providing a sensor circuit on the rotating component, the strain sensor circuit comprised of the transmitting element, the modulating element, and the passive resistive element, wherein an effective resistance of the passive resistive element varies with one of a strain on the rotating component, a temperature on the rotating component, and a temperature about the rotating component.

16. The method of claim 12, wherein the measurand is indicative of at least one of a strain on the rotating component, a temperature of the rotating component, or a temperature about the rotating component.

17. The method of claim 12, wherein the wireless coupling between the at least one of a transmitting element and a receiving element and the modulating element is one of a magnetic coupling, an electromagnetic coupling, and an electric coupling.

18. The method of claim 12, wherein the rotary machine comprises a turbine engine, and wherein the rotating component comprises a blade.

19. A wireless sensing system, comprising:
   a passive resistive element;
   at least one of a transmitting element and a receiving element;
   a modulating element located on a rotating component of a rotary machine and wirelessly coupled to the at least one of a transmitting element and a receiving element,
   wherein the modulating element is selected to modulate the wireless coupling between the at least one of a transmitting element and a receiving element, in response to a change in resistance of the passive resistive element, and
   wherein the modulation of the wireless coupling is indicative of a measurand on the rotating component; and
   a processor configured to calculate at least one of a strain in the rotating component, temperature in the rotating component, and temperature about the rotating component based on the modulation of the wireless coupling.

* * * * *